United States Patent [19]

Aldridge

[11] Patent Number: 4,875,404

[45] Date of Patent: Oct. 24, 1989

[54] COMPACT FLUID POWERED ACTUATOR

[75] Inventor: Lewis L. Aldridge, Morris Plains, N.J.

[73] Assignee: Ewal Manufacturing Co., Inc., Belleville, N.J.

[21] Appl. No.: 215,776

[22] Filed: Jul. 5, 1988

[51] Int. Cl.⁴ .............................................. F01B 9/00
[52] U.S. Cl. ................................ 92/130 A; 92/130 D; 92/140; 74/107; 74/110; 74/569
[58] Field of Search .................... 92/13.7, 130 A, 140, 92/130 R, 130 C, 130 D; 74/107, 110, 569

[56] References Cited

U.S. PATENT DOCUMENTS

| | | | |
|---|---|---|---|
| 1,513,424 | 10/1924 | Richards | 92/13.7 X |
| 2,165,985 | 7/1939 | Schweintler | 74/110 |
| 2,829,500 | 4/1958 | Butler | 92/140 X |
| 2,897,784 | 8/1959 | Harper | 92/140 X |
| 2,908,478 | 10/1959 | Starrett | 92/140 X |
| 3,416,635 | 12/1968 | Salton | 92/140 X |
| 4,401,010 | 8/1983 | Eddington et al. | 92/13.7 X |
| 4,549,719 | 10/1985 | Baumann | 74/110 X |

FOREIGN PATENT DOCUMENTS 879112  11/1981  U.S.S.R. ............................. 92/140

*Primary Examiner*—Robert E. Garrett
*Assistant Examiner*—Mark A. Williamson
*Attorney, Agent, or Firm*—John G. Gilfillan, III

[57] ABSTRACT

A fluid actuator having a piston, a pair of springs, a pair of cams, and a pair of cam followers mounted in a housing. A normally open valve is coupled to the actuator output shaft for actuation. When fluid pressure is applied to the piston, the springs are compressed, and the cam followers are moved down to permit the cams to rotate away from each other, thereby reducing the force on the actuator output shaft and permitting the valve to open. When fluid pressure is removed from the piston, the springs expand pushing the piston and the cam followers up, thereby rotating the cams toward each other and forcing the actuator output shaft against the valve stem to close the valve.

13 Claims, 2 Drawing Sheets

COMPACT FLUID POWERED ACTUATOR

BACKGROUND OF THE INVENTION

The present invention relates to control systems and more particularly to fluid actuators to activate process control equipment by use of pneumatic or hydraulic signals.

In the field of control systems, it has been the general practice to employ actuators to activate process control equipment in response to various types of input signals. Fluid actuators have found particular use in control systems wherein electrical signals are either not available or would be hazardous. For example, in many manufacturing processes, such as semi-conductor fabrication processes, the rate of flow of highly toxic, flammable gases must be regulated continuously throughout the process. In such cases, the use of pneumatic actuators is wide spread as a means for safely providing an activating output force for opening or closing a valve to automatically control the rate of fluid flow.

One of the most critical problems confronting developers of fluid actuators has been the reduction of their overall size. When the fluid actuator is used to control the flow of hazardous fluids, e.g., flammable or toxic gases, the fluid containers, valves, and controls are usually stored in a specially designed ventilated compartment. In order to increase the efficient use of such equipment, it is desirable to reduce the size of the valves and controls so that, for a given size compartment, the volume of space available for fluid storage is a maximum. This requirement is difficult to satisfy when it is necessary that such actuators also produce considerable output forces, as is the case in the regulation of hazardous fluids.

Prior attempts at the solution of this problem include the single piston actuator, wherein the output force is directly related to the effective area of the piston. Such actuators are not satisfactory because they usually require a considerable diameter in order to develop sufficient force. Another improvement is the multiple piston actuator. These actuators have two or more pistons in series in an attempt to increase the output force while reducing the diameter. However, such actuators are usually complex and suffer from undue height. Other actuators have used various mechanical devices, e.g., cams, rack and pinions, etc., for multiplying the output forces of a low profile device. Such attempts have often resulted in either complex, or expensive, or unacceptably large structures. In all of the above cases wherein a reasonably small actuator is designed to develop high output thrusts, short life has been a problem because of wear and fatigue in overstressed components.

For these and similar reasons, those concerned with the development of fluid actuators have recognized the need of increasing actuator output force while reducing actuator size. The present invention fulfills this need.

SUMMARY OF THE INVENTION

The general purpose of this invention is to provide a compact fluid actuator of substantially reduced size without sacrificing the many advantages of similarly employed larger devices. Additionally, the output force of the present actuator can be substantially constant over the full stroke or it can be designed to have a number of different variable relationships with respect to the distance traveled.

To attain this, the present invention provides a fluid actuator having a housing containing a slideable piston to define a chamber for receiving actuating fluid under pressure. On the opposite side of the piston are a stored-energy structure, a force multiplying mechanism, and an force output mechanism. When actuating fluid is introduced into the chamber with sufficient pressure, the piston transmits energy directly to the stored-energy structure. Simultaneously, the force multiplying mechanism gradually reduces the output force on the force output mechanism. When actuating pressure in the chamber is reduced, the stored-energy structure will give up energy to the output mechanism through the force multiplying mechanism. As such, the present actuator can generate a significant output force over a short stroke for actuating control equipment.

The exact nature of this invention as well as other objects and advantages thereof will be readily apparent from consideration of the following specification relating to the annexed drawings in which:

DESCRIPTION OF THE PREFERRED EMBODIMENT

Figure 1:
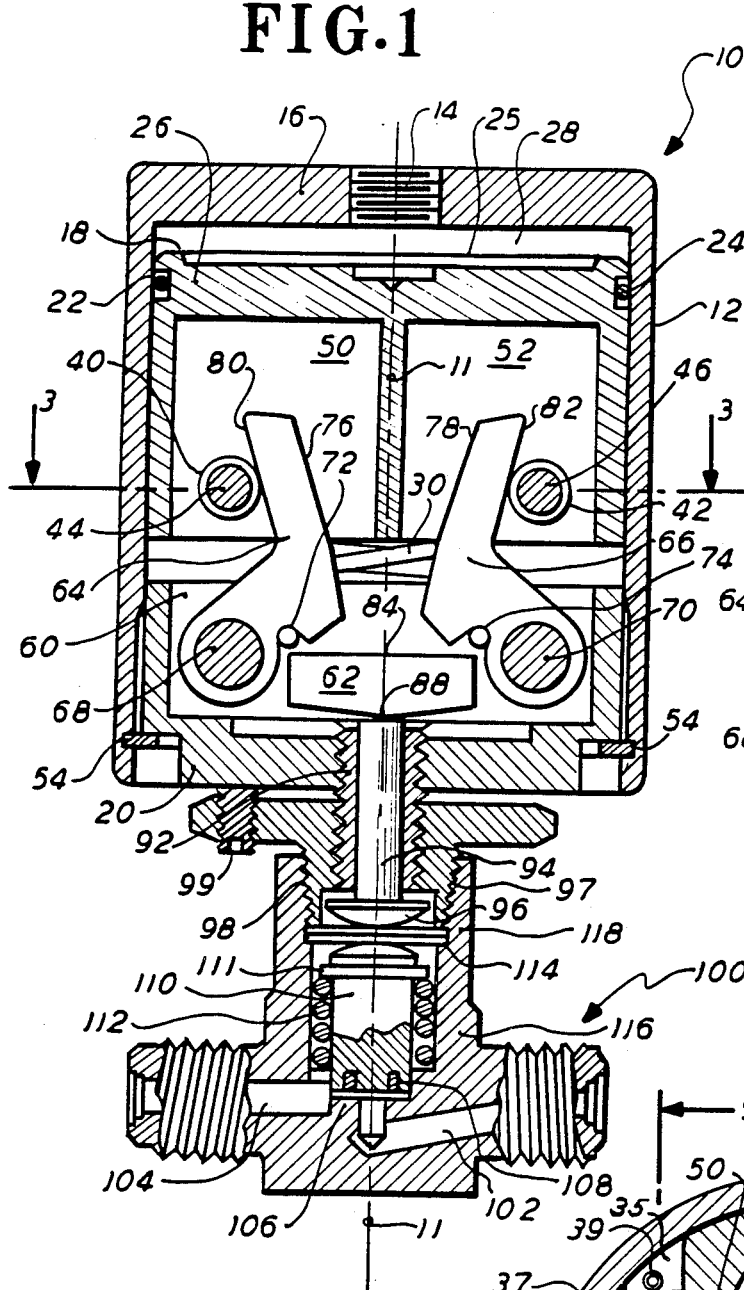
FIG. 1 is a sectional elevation view of a preferred embodiment cut on a plane intersecting the center line 11.
Figure 4:
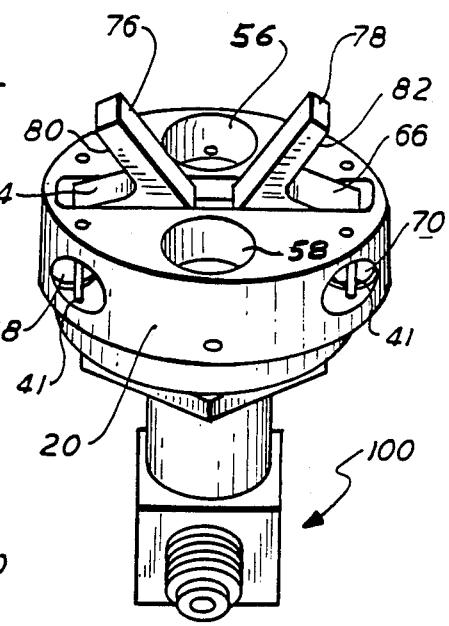
FIG. 4 is a perspective view of a portion of the device shown in FIG. 1.
Figure 3:
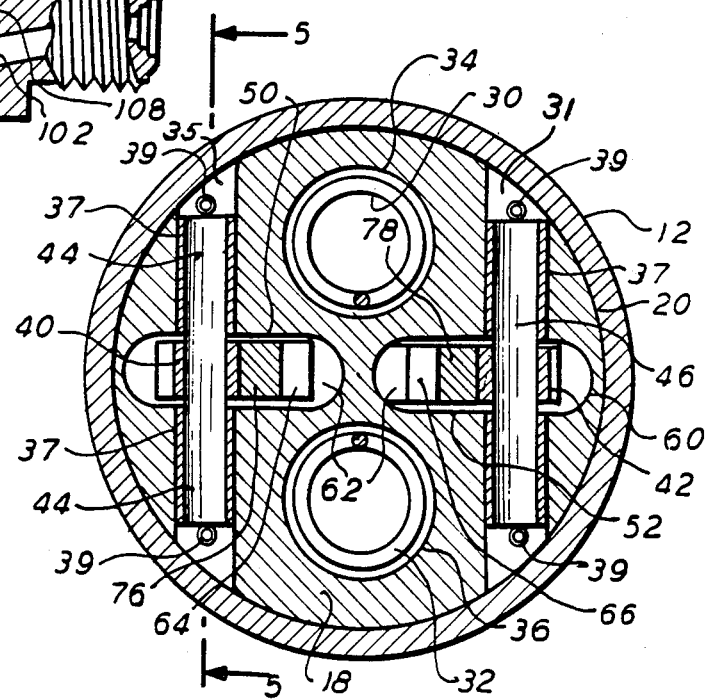
FIG. 3 is a sectional plan view taken in the plane 3—3 looking in the direction of the arrows.
Figure 2:
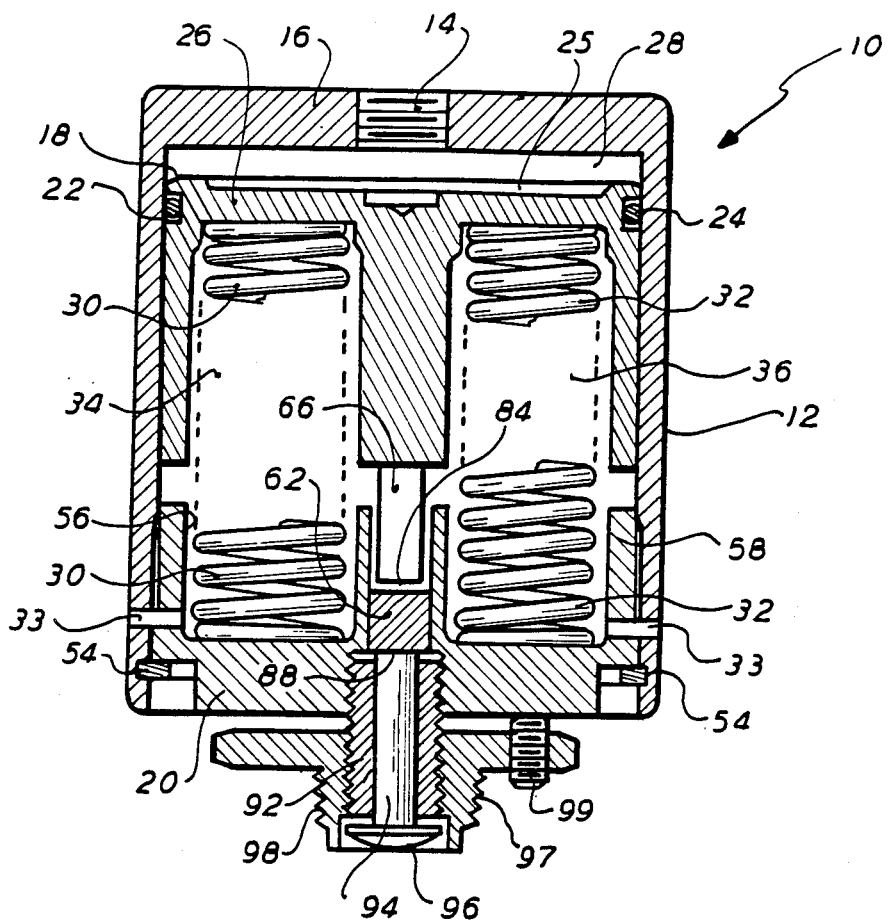
FIG. 2 is a sectional elevation view of a portion of the device shown in FIG. 1 looking in a plane perpendicular to the plane of FIG. 1 and intersecting the center line 11.
Figure 5:
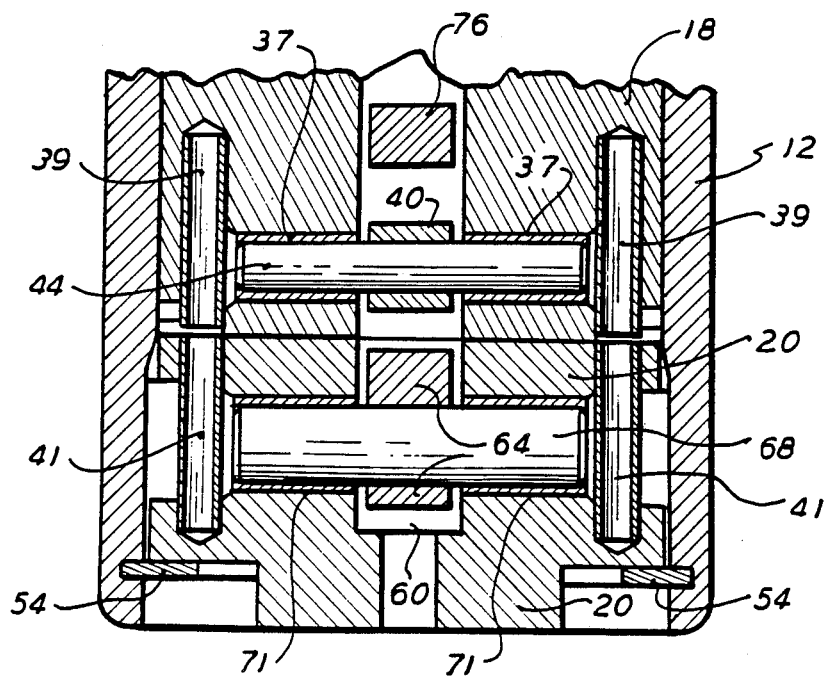
FIG. 5 is a sectional view then in the plane 5—5 of FIG. 3 looking in the direction of the arrows.

FIGS. 1-5, which illustrate a preferred embodiment of the actuator 10, shows a cylindrical cup-shaped housing 12 having a threaded fluid input opening 14 extending axially through end wall 16. The other end of housing 12 is open for receiving a cylindrical piston 18 and base 20. At the upper end of piston 18 is an annular groove 22 for retaining a seal 24. The upper surface of wall 26 of piston 18, and the end wall 16 and side wall of housing 12 form a chamber 28. Upper surface of wall 26 has a recessed portion 25 for providing a significant surface area on the piston 18 against which fluid pressure can operate, even when the piston 18 is in the full upward position against wall 16. Vent holes 33 are drilled in housing 12 and base 20.

Piston 18 is provided with a pair of axially extending bores 34, 36, the axes of which are parallel to, coplanar with and spaced from the axial centerline of piston 18. Bores 34 and 36 are for receiving therein coil springs 30 and 32 respectively as is discussed below. Also formed in piston 18 are a pair of radially extending elongated slots 50, 52. The radial axes of slots 50, 52 are coplanar with the axial centerline 11 of piston 18 and generally normal to the plane containing the axes of bores 34 and 36.

Also found in piston 18 are a pair of chordally extending throughbores 31 and 35 which pass through slots 50 and 52 respectively. Disposed in throughbores 31 and 35 are cam follower axles 44 and 46 respectively which are rotatably received adjacent their ends through sleeve bearings 37 also received within throughbores 31 and 35. Axles 44, 46 are retained in the throughbores 31, 35 by pins 39 retained in the walls of piston 18. Rotatably mounted centrally of cam follower axles 44 and 46 within slots 50, 52 are cam followers 40 and 42, follower 40 being mounted on cam follower axle 44 and follower 42 being mounted on cam follower axle 46.

The structure of base 20 is similar to that of piston 18 and mirrors piston 18. More specifically, cylindrical base 20 is provided with a pair of axially extending bores 56, 58 which are coaxial with bores 34, 36 of piston 18 when the actuator 10 is assembled. Also formed in base 20 is an elongated, diametrically disposed slot 60, the general plane of which is perpendicular to the plane defined by the longitudinal axis of base 20 and bores 56, 58.

Operatively, disposed within slot 60 are a pair of cams 64, 66. In this regard, cam levers are secured respectively to axles 68 and 70 which are rotatably mounted within throughbores 67, 69 formed through base 20. Axles 68 and 70 are retained within throughbores 67, 69 through the use of pins 41 in the same manner as is discussed above with respect to pins 39.

One surface of each of cams 64, 66 is relieved to define a channel for operatively receiving hardened pin bearings 72, 74 which slide on a load beam 62 for purposes as are discussed below. Opposite surfaces of cams 64, 66 are shaped to define cam surfaces 80, 82 which are in operative engagement with cam followers 40 and 42 respectively. Thus, cam 64 is operatively contained within slots 60 and 50, and cam 66 is operatively contained within slots 60 and 52.

Load beam 62 is disposed within slot 60 and is provided with a flat upper surface 84 and a tapered lower surface 88. In this regard, load beam 62 may be displaced vertically during operation of the actuator as is discussed below.

A threaded opening in base 20 receives an adjustable, tubular travel stop 92. Extending coaxially into travel stop 92 is an output shaft 94 having a button 96 at one end and a flat surface at the other end in contact with the edge 88 of load beam 62. A bonnet 98 is threaded onto travel stop 92 and carries an outside threaded portion 97 for mounting a standard valve 100 or other device to be actuated. Bonnet 98 also includes a plurality of set screws 99 for engagement against the base 20 to fix actuator 10 in position relative to bonnet 98.

The device being activated, as shown in FIG. 1, is a conventional, normally open fluid valve 100 of the flow-to-open type generally used to regulate the flow of hazardous fluids. Valve 100 includes inlet passage 102, outlet passage 104, valve seat 106, flexible plug 108, stem 110 having a button 111, a coil spring 112, and a flexible diaphragm 114 mounted in body 116. Coil spring 112 urges stem 110 upwardly as shown in FIG. 1. The valve body 116 has a threaded sleeve 118 for connecting the valve 100 to the actuator 10 via the threaded portion 97 on bonnet 98.

The combination shown in FIG. 1 is configured to maintain the valve 100 closed when no actuating fluid pressure is present in chamber 28. More specifically, if no actuating pressure is provided in chamber 28, springs 30, 32 displace piston 18 upwardly and therewith cam followers 40, 42. Upward displacement of the cam followers 40, 42 causes rotation of cam lever 64 in clockwise direction and rotation of cam lever 66 in the counterclockwise direction. These motions cause downward displacement of pin bearings 72, 74, load beam 62, shaft 94 and stem 110 until plug 108 engages seat 106 to preclude flow. Therefore, if a failure should occur in either the actuating system (not shown) or the actuator 10, whereby activating pressure is lost, the actuator 10 will maintain the valve 100 closed. Of course, this configuration is simply an illustration of one possible embodiment, and those skilled in the art will appreciate other variations.

Valve 100, by itself, is a normally open valve because spring 112 will normally force stem 110 and, therefore, plug 108 away from seat 106. To close valve 100, the stem 110 must be moved down with sufficient force to compress plug 108 into sealing engagement with seat 106. Hence, in order to actuate valve 100, the output shaft 94 of actuator 10 must provide substantially no force to permit valve 100 to open under the influence of spring 112, and a substantial force to close valve 100. The force necessary to close valve 100 must be at least large enough to overcome the pressure of spring 112, plus any fluid pressure in the valve 100 and pressure needed to seal plug 108. As indicated earlier, the output shaft 94 will open valve 100 when there is actuating pressure in chamber 28. Therefore, with full actuating pressure in chamber 28, there will be no output force on output shaft 94. On the other hand, with no actuating pressure in chamber 28, maximum force will be transmitted on output shaft 94.

The operating sequence during actuation will now be described. When no actuating pressure is provided at opening 14, the piston 18 is forced towards wall 16 by springs 30, 32. Also, cam arms 76, 78 are forced toward each other by cam followers 40, 42, respectively, thereby forcing bearings 72, 74, respectively, against the upper surface 84 of load beam 62. In turn, beam 62 is forced down and piston 18 moves up until the edge 88 is stopped by the upper surface of travel stop 92.

It is pointed out here that the distance travel stop 92 extends through base 20 is adjustable and will determine the stroke of piston 18 and the stroke of output shaft 94. Also, with the stop 92 withdrawn to a point where it is flush with the interior surface of housing 20, the stroke will be a maximum. When adjusted for maximum stroke, the piston 18 will move the full distance in housing 12 until wall 26 abuts wall 16. In practice, the stop 92 is used to adjust the stroke of the output shaft 94 to be equal to the sealing stroke of stem 110.

Continuing with the sequence of operation, as the load beam 62 is forced down, it will force the output shaft 94 down against the flexible diaphragm 114. Likewise, the valve stem 110 will be forced down against the upward force of spring 112 and any fluid pressure in valve 100. Additionally, with the valve 100 fully closed, springs 30, 32 must supply a force necessary to compress and seal the valve plug 108 against seat 106.

To summarize in terms of force loads, with no actuating pressure present in chamber 28, the springs 30, 32 exert an upward load on the piston 18. The piston 18 presses against the piston bearings 37, which transmit the load to the ends of the cam follower axles 44, 46, which in turn press against the cam followers 40, 42, forcing them against the cam surfaces 80, 82, tending to force the arms 76, 78 toward each other. The torque, causing the arms 76, 78 to rotate towards each other about their axles 68, 70, creates an opposing torque as the cams 64, 66 force the bearings 72, 74 against the load beam 62. Beam 62 is forced down against the output shaft 94 which transmits its load to the valve 100 or other device requiring activation. When sufficient actuating pressure is applied to the piston 18, via opening 14 and chambers 28, to overcome the combined effects of the compression of springs 30, 32, the friction of seal 24, and the vertical components of the forces exerted by the loads on cam follower axles 44, 46, the piston 18 moves down, allowing the arms 76, 78 to rotate away from each other, and allowing the load beam 62 and output shaft 94 to move upwards under the influence of forces applied by the valve 100, via valve stem 110, or other activated device. The output force available on output shaft 94 is the result of spring forces generated by coil springs 30, 32.

Actuation of valve 100 requires that considerable force be applied to close it and then hold it closed against the combined effects of (a) valve 100 outlet pressure acting on the effective area of the seal diaphragm 114, (b) the difference between valve inlet and outlet pressure acting on the area of the valve plug 108, (c) valve spring loads due to deflection of the diaphragm 114 (usually spring metal) and to compression of coil spring 112, the function of which is to assure that the button 111 remains in contact with the diaphragm 114, and (d) the seat 106 and plug 108 reaction load, which results from the need to force the sealing surfaces together to close microscopic leak paths and establish a suitably tight seal.

In the absence of actuating pressure, the actuator 10 must be able to force the valve 100 closed against the worst case combination of forces listed above. On application of actuating pressure, the actuator 10 must reduce the valve 100 closing force to a low enough value to allow the internal forces tending to open the valve 100 to predominate. Because the highest forces tending to oppose closing the valve 100 will not in general be present when it is desired to open it, the actuator 10 must not require more opening force from the valve 100 than can be obtained from valve spring loads (spring 112, diaphragm 114 and plug 108).

The actuator springs 30, 32 must store sufficient energy to close valve 100. Springs capable of exerting a load adequate to hold valve 100 closed will tend to exert higher loads as they are further compressed to allow the valve 100 to open. This means that, for conventional actuators where output force is equal to the difference between spring load and a force related to actuating pressure, the effective piston area on which the actuating pressure acts will have to be based on obtaining the capability to develop a force even greater than that required to exert the highest thrust needed to operate the valve. The amount of actuator spring force to be overcome, in excess of the maximum force the actuator must develop, can be reduced by using low spring rate springs. However, the lower spring rate will require an increase in spring height, weight, and cost. On the other hand, by use of force transmission means employing varying mechanical advantage, the present actuator 10 is able to exert high loads even when the springs 30, 32 are lightly compressed, so that even a small diameter piston 18 and relatively low operating pressures are able to exert sufficient force to compress the springs 30, 32 to the extent required. It is primarily because of this feature combined with the reduction of force-wasting friction devices, that the actuator 10 can be made compact.

The maximum force developed by springs 30, 32 is selected to be slightly less than the product of the available actuation fluid pressure and the effective area of the piston 18. The stroke of piston 18 is selected to allow the springs to deliver the required amount of energy to the load beam 62, and is in general greater than the stroke of the stem 110. The cams 64, 66 are shaped to develop the required high force, constant or variable, at the load beam 62. Therefore, the output force may have constant or increasing values even though the available force of springs 30, 32 decreases as the springs 30, 32 extend. The energy wasted in overcoming friction is reduced to an acceptable value by (a) arranging for rolling contact between the cam surfaces 80, 82 and the cam followers 40, 42, (b) providing antifriction bearings 35, 37 and 71, (c) by minimizing the moment arm about the cam axles 68, 70 associated with the frictional forces resulting from the sliding contact between the bearings 72, 74 and the surface 84, and (d) by having only one dynamic seal 24 whose friction absorbs energy from the springs 30, 32. As such, actuating pressure is contained by only one dynamic seal 24, and the only other leak path that must be sealed is the joint between the opening 14 and a connecting device (not shown).

The present actuator 10 uses relatively mechanically efficient force multiplying elements, i.e., cams 64, 66, to match the available forces to those required. If the integral over the full travel of the maximum force required vs. travel is found, it represents a minimum amount of work which the springs 30, 32 must be capable of delivering, and a minimum amount of work which the actuating fluid must be capable of doing in operating the actuator 10. In general, there is a poor match between the force which a practical spring or springs can apply at a given position and the force required by the device requiring actuation. Similarly, there is in general a poor match between the force which actuating fluid at the available pressure can apply to piston 18 and the force required to overcome the worst case combination of spring and output thrust forces. It is the force matching characteristics of the present combination of elements that makes possible the compact actuator 10.

It is essential that actuators of the present type have an adjustable output stroke so that the device being actuated, valve 100, is not overstressed. For example, overstressing the diaphragm 114 and/or the valve seat 106 could cause damage to these parts. Stroke limitation is accomplished by providing the travel stop 92 which is capable of adjusting the maximum motion of the load beam 62 to any value between zero and the travel which results when piston 18 contacts the wall 16. Adjustment of stop 92 is accomplished by pressurizing an assembled actuator 10 sufficiently to force piston 18 against base 20, screwing travel stop 92 until it contacts edge 88 (at which point the stroke is zero), then backing stop 92 out to obtain the required stroke.

The travel stop 92 also functions to absorb excess forces that may damage many structures. Actuator 10 is able to supply substantial forces beyond those necessary to operate the device being actuated, e.g., valve 100. All excess loads, over those required to close valve 100 and compress the seat 106 a safe amount, will be applied by the load beam 62 to the travel stop 92. This feature is important because it is often necessary to limit the output force since many devices contain non-metallic components subject to crushing or extrusion if overloaded. For example, many valves employ seat discs which would be permanently damaged by forces well under those necessary to overcome the maximum pressure related forces tending to open the valve.

It is also noted that in the present actuator 10, substantial wear may take place in the bearings, e.g., bearings 37, 38, with no loss of capability to close valve 100 and no change in the closed position of the stem 110.

Finally, the use of force multiplying elements, cams 64, 66, which reverse the direction of the load of springs 30, 32 as well as increasing its magnitude allows the actuating pressure to be applied at the top (opening 14 in wall 16) of the housing 12 without the penalties associated with additional seals that normally result when designing a spring-to-close actuator for a flow-to-open valve. With the centrally located actuation pressure opening 14 on the top of the housing 12, the arrangement of the plumbing (not shown) to connect actuation fluid to the actuator 10 is unaffected by the radial position of the actuator 10 relative to the valve 100, and is less affected by clearance problems than in actuators which require an actuation pressure connection at the base 20.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A fluid actuator comprising:
   a cylindrical housing having a base;
   a piston slideably mounted in said housing and defining a fluid chamber;
   means for permitting pressurized fluid to be applied to said chamber;
   a stored-energy element mounted in said housing between said piston and said base, said element having an increase in energy storage when fluid pressure in said fluid chamber moves said piston toward said base and having a reduction in energy storage and forcing said piston to move away from said base when fluid pressure in said fluid chamber is reduced;
   an output shaft having one end slideably extending from said housing through said base;
   a lever pivotally mounted on said base and having a first arm and a second arm shorter than said first arm; and
   means coupling said first arm to said piston and said second arm to another end of said output shaft for forceably moving said shaft in a direction toward said one end in response to movements of said piston away from said base.

2. A fluid actuator according to claim 1 wherein: said first arm has a cam surface thereon; and a cam follower connected to said piston engaging said cam surface.

3. A fluid actuator according to claim 1 further including means for adjusting the stroke of said piston and said output shaft.

4. A fluid actuator according to claim 3 wherein said means for adjusting the stroke includes a stop member adjustably mounted on said base in the path of said output shaft.

5. A fluid actuator comprising:
   a tubular housing having opposed end walls;
   a piston slideably mounted in said housing and defining a sealed fluid chamber between said piston and one of said end walls;
   an opening in said one of said end walls communicating with said sealed fluid chamber;
   a coil spring mounted between said piston and the other of said end walls;
   a cam follower mounted on said piston;
   a lever, having a first arm with a cam surface, pivotally mounted on said other of said end walls with said cam surface slideably engaging said cam follower;
   said lever having a second arm; and
   an output means including a shaft coupled to said second arm and moveably extending from said housing through said other of said end walls for forceably moving said shaft in a direction out of said housing in response to an expansion of said coil spring.

6. An actuator according to claim 5 wherein said first arm is substantially longer than said second arm.

7. An actuator according to claim 6 wherein said cam surface and follower are shaped such that said second arm exerts a substantially constant force on said shaft over substantially the entire stroke of said piston.

8. An actuator according to claim 7 further including a stop means for adjusting the length of the stroke of said piston.

9. An actuator according to claim 7 further including a rigid stop member adjustably mounted on said other of said end walls in the path of movement of said shaft.

10. A fluid actuator comprising:
    a tubular housing having opposed end walls;
    a piston slideably mounted in said housing and defining a sealed fluid chamber between said piston and one of said end walls;
    an opening in said one of said end walls communicating with said chamber;
    a pair of coil springs, each mounted between said piston and the other of said end walls;
    a pair of cam followers mounted on said piston;
    a pair of levers, each having a first arm with a cam surface, pivotally mounted on said other of said end walls with said cam surfaces each slideably engaging a different one of said cam followers;
    each said lever having a second arm; and
    an output means including a shaft slideably mounted on said housing and having an end extending from said housing, through said other of said end walls, and said shaft coupled to said second arms for forceably moving said shaft out of said housing in response to an expansion of said coil springs.

11. A fluid actuator according to claim 10 wherein said levers are located on opposed sides of said output shaft.

12. A fluid actuator according to claim 11 further including a third lever having a fulcrum engaging said output shaft and slideably moving therewith, and having opposed arms engaging a different one of said second arms.

13. A fluid actuator according to claim 11 wherein a stop member is adjustably mounted on said other of said end walls adjacent said output shaft in the path of movement of the fulcrum of said third lever.

* * * * *